(No Model.) 2 Sheets—Sheet 1.

T. W. CORBY.
BRICK MOLD.

No. 352,042. Patented Nov. 2, 1886.

Witnesses
J. Paul Mayer
Sumner Collins.

Inventor
Thomas W. Corby
by Geo. H. Lothrop
atty.

(No Model.) 2 Sheets—Sheet 2.

T. W. CORBY.
BRICK MOLD.

No. 352,042. Patented Nov. 2, 1886.

Witnesses
J. Paul Mayer
Sumner Collins

Inventor
Thomas W. Corby
by Geo. H. Lathrop
atty.

N. PETERS, Photo-Lithographer, Washington, D. C.

UNITED STATES PATENT OFFICE.

THOMAS W. CORBY, OF GROSSE POINTE, MICHIGAN.

BRICK-MOLD.

SPECIFICATION forming part of Letters Patent No. 352,042, dated November 2, 1886.

Application filed November 24, 1885. Serial No. 183,880. (No model.)

*To all whom it may concern:*

Be it known that I, THOMAS W. CORBY, of Grosse Pointe, in the county of Wayne and State of Michigan, have invented a new and useful Improvement in Brick-Molds, of which the following is a specification.

My invention consists in an improvement in brick-molds, hereinafter fully pointed out in the claims.

Figure 1:
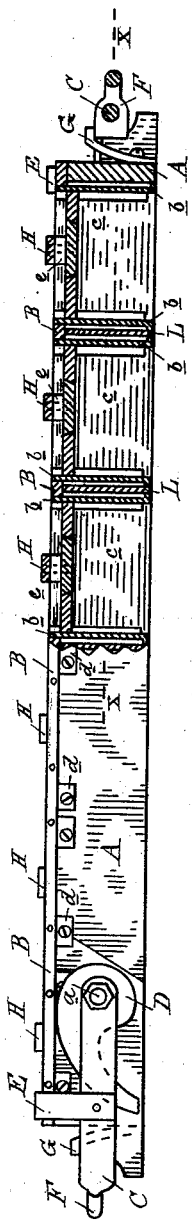
Figure 2:
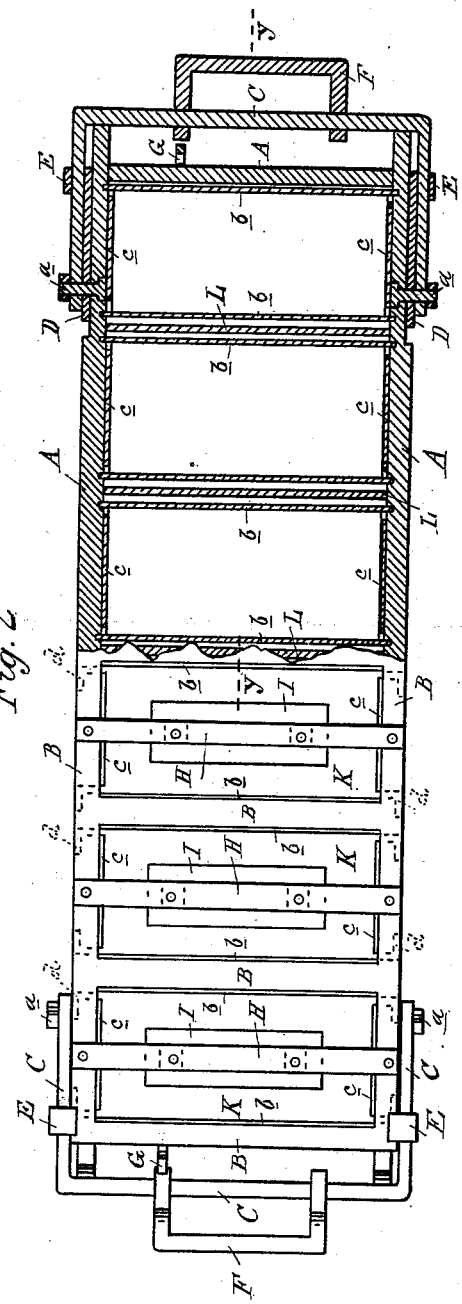
Figure 3:
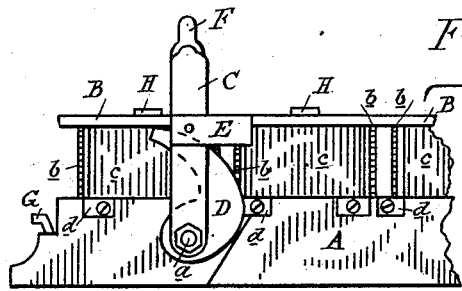
Figure 4:
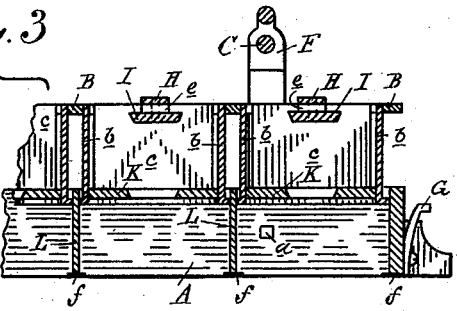
Figure 4:
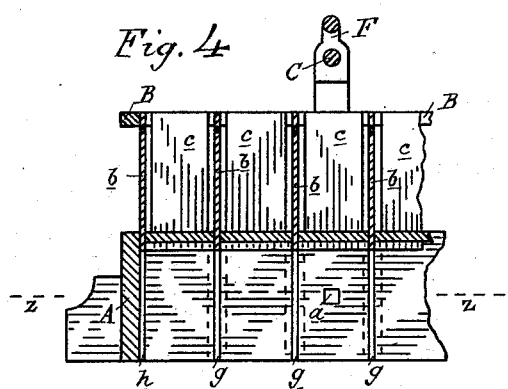
Figure 6:
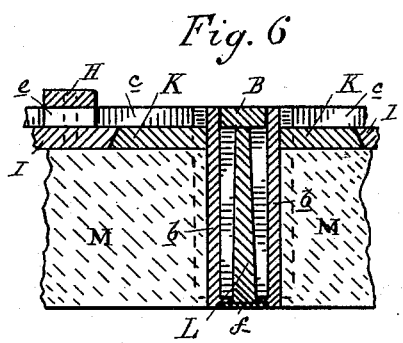
Figure 5:
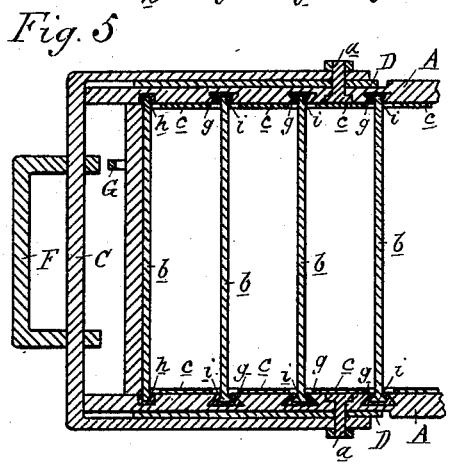
Figure 7:
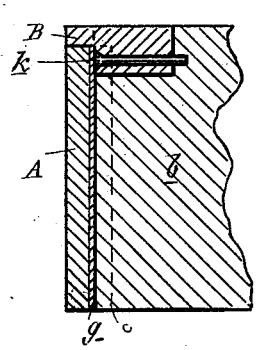
Figure 8:
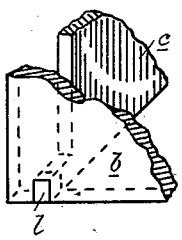

Figure 1 is a side elevation of a mold adapted to form six bricks, one-half thereof being in section; and Fig. 2 is a bottom plan view of the same, one-half in section on the line $x$ $x$, Fig. 1. Fig. 3 is an enlarged view, similar to Fig. 1, with the mold-linings raised. Fig. 4 is an enlarged vertical central section through the elevation shown in Fig. 3, but with the sides of the mold movable, instead of having simply the linings movable. Fig. 5 is a section on the line $z$ $z$, Fig. 4. Fig. 6 is an enlargement of the sectional portion of Fig. 3. Fig. 7 is a section showing the detail of fastening the movable plates to the frame. Fig. 8 is a detail view showing the interlocking of the side and end mold-linings.

A represents a rectangular frame, long and deep enough to be divided into six compartments, each of the proper size to form a brick-mold. Of course the frame may be larger or smaller at will; but I have chosen a six-mold frame as a convenient size for illustration.

L L represent five partitions secured to the sides of frame A, and, with the ends of said frame, divide the frame into six equal compartments, each a little larger than is necessary to mold a brick.

$b$ $b$ $c$ $c$ represent thin iron plates, which line the sides and ends of each compartment or mold, the plates $b$ $b$ extending across the opening in frame A, and the plates $c$ $c$ extending across the ends of each compartment, and being locked to the plate $b$ $b$ in each compartment by means of the lugs $l$, Fig. 8, formed on the upper corners of each plate $c$, and extending into holes formed in the edges of plates $b$ $b$.

B represents an iron frame of the same size as frame A, and adapted to lie on top of frame A. Each plate $c$ is made deeper than frame A, and is secured to the frame B, either by a pin, $k$, passing through an offset in frame B into plate $c$, as shown in Fig. 7, or in any other convenient manner.

K K represent bottoms, either of wood or metal, secured in each mold, being fastened to frame A at the corners of each compartment, the plate $c$ being cut away at each end to permit this, as shown in Figs. 1 and 3.

H H represent bars running across frame B, and secured thereto above the center of each compartment or mold in frame A, and to each bar H is secured a block, I, which fits into a hole formed in the bottom K, so as to form a portion of said bottom when the frame B is down on frame A.

D D represent four cams, one of which is pivoted to frame A, near each corner, by a pin, $a$, said pin being rigid with the cam, and also rigid with a bail, C, which connects the opposite pins $a$. The cams D lie under the frame B, so that when said cams are moved they will raise or lower said frame B.

E E represent stirrups, one of which is secured to each bail C, passing over the bottom of frame A to limit the motion of bail C when returned to its normal position.

F F represent smaller bails, one on each bail C, to afford hand-holds to operate bails C C; and G G represent springs which are fastened to the ends of frame A and operate as spring-catches, engaging with bails F F and holding bails C C in their normal position.

I prefer to make the partitions L L beveled on both sides, so that they will be thinner at the bottom of frame A than at the top, and to provide the upper edges on plates $b$ $b$ with outwardly-turned flanges, as shown in Fig. 6, to bear against said partitions.

$d$ $d$ represent screws or bolts which fasten the bottoms K K to frame A.

In the arrangement shown in Figs. 4 and 5 the partitions L L are omitted and the ends of plates $b$ $b$ are dovetailed loosely into the sides of frame A, the dovetail on the plates $b$ being represented by $i$ and in the frame by $g$. The plate $b$ which lies against the end wall of frame A need not be dovetailed, but may simply extend into a groove in the frame, as shown at $h$, Fig. 5. When this arrangement is used, I prefer to make the frame A deep enough to mold a brick edgewise and place the plates $b$ $b$ at such distances apart as to form molds to make brick on edge, in which manner a greater number of bricks can be molded in a frame of given length.

The operation of my invention is as follows: The frame A, with the frame B lying close along its lower edge, is placed in a brick-machine of any known type which works with molds, and clay is fed into the molds in the frame and pressed therein in the ordinary manner until all the molds in the frame are filled and the clay properly pressed therein. The frame A is then removed from the machine, the bails C F affording convenient means for lifting it, and carried to the place where the bricks are to be hacked. The frame A is then turned over so that its open side is downward, and the bails C C are drawn up into the position shown in Figs. 1 and 3. This is readily done by first turning the bails F F into a vertical position, so as to disengage them from the spring-catch G, and then pulling on said bails F F. As bails C C turn up the cams D D turn with said bails and force the frame B away from the frame A, as shown in Fig. 3, and as the plates c c are fastened to the frame B by the pins K, and the plates b b to the plates c c by the lugs l, the plates b b c c in each mold are drawn out from the mold, thus enlarging the mold on all sides, and permitting the brick to drop out easily. And by beveling the partitions L L, as shown in Fig. 6, the operation of withdrawing the plates is facilitated, because the plates b b, as they move, recede from the sides of the brick in an obvious manner. As the bars H are fastened to frame B and the blocks I to the bars H, the motion of frame B will cause bars H to lift the blocks I out from their position in the bottoms of the molds, thus lessening the bottom surface to which the moist bricks can adhere, and also admitting air freely into the molds, and preventing any tendency to the formation of a vacuum therein as the bricks fall out. As the bails C C turn up to the proper position in which the plates b b c c are sufficiently withdrawn from the molds, the stirrups E E come in contact with frame B, as shown in Fig. 3, and check the movement of bails C C, thus preventing the complete withdrawal of plates b b c c from the molds or their withdrawal to such an extent as to break the bottoms K out of the molds.

It is evident that certain structural changes, such as fastening the cams D to the bails C and allowing both to turn freely, pins a, &c., may be substituted for the construction shown.

The operation of the modification shown in Figs. 4 and 5 is as above described, but the partitions L L are not used.

What I claim as my invention, and desire to secure by Letters Patent, is—

1. A brick-mold consisting of a series of compartments, each having removable plates on its sides and ends, and means, as specified, for locking said plates in place and for withdrawing them to permit the removal of the bricks, substantially as described.

2. A brick-mold consisting of a frame divided by partitions to form a series of compartments, removable side and end plates located within said compartments, a second frame lying on the first and connected with said removable side and end plates, and means for locking said parts together and for removing said plates with the second frame to allow the molds to be emptied, substantially as described.

3. The combination, with the frame A, having partitions L L and bottoms K K, of the frame B, the side plates, b b, and end plates, c c, secured to said frame B and removably located within the compartments of the frame A, and the cams D D, pivoted to said frame A and adapted to operate upon the frame B to remove the attached side and end plates prior to emptying the molds, substantially as described.

4. The combination, with the frame A, having a series of compartments, of the frame B, provided with attached plates b b and c c, removably located within said compartments, and the cams D D and bails C F, pivoted to the frame A and acting upon the frame B, whereby said frame B and attached plates are removed to empty the molds, substantially as described.

5. In combination with the frame A, a series of compartments provided with bottoms K, each having a portion thereof cut away, the frame B, bars H, secured to said frame, and blocks I, secured to said bars, substantially as shown and described.

6. In combination with the frame A, having stationary beveled partitions L and bottoms K, the frame B, and the movable side plates, b b, and end plates, c c, resting against said partitions L and secured to said frame B, substantially as shown and described.

7. In combination with the frame B, the plates c, secured thereto and having thereon the lugs l, and the plates b, having notches therein to receive said lugs, the frame A, provided with a series of compartments to receive the plates b c, and means for securing and detaching said frames, substantially as shown and described.

8. In combination with the frame A, having the spring-catch G thereon, the frame B, bails C and cams D, pivoted to frame A, and the bails F, pivoted on bails C and engaging with spring-catches G, substantially as shown and described.

9. In combination with the stationary partitions L, the facings f, secured to the upper edge thereof and extending partially over the flanges on the plates b, substantially as shown and described.

THOMAS W. CORBY.

Witnesses:
CHARLES H. CAMPBELL,
GEO. H. LOTHROP.